US010447796B2

(12) United States Patent
Guan et al.

(10) Patent No.: US 10,447,796 B2
(45) Date of Patent: Oct. 15, 2019

(54) PUSHLET INSTANT MESSAGING FRAMEWORK AND PUSHLET INSTANT MESSAGING METHOD

(71) Applicant: Wistron Corporation, New Taipei (TW)

(72) Inventors: Peng Guan, New Taipei (TW); Cheng Xu, New Taipei (TW); Tong-Wang Huo, New Taipei (TW); Jin-Guang Wan, New Taipei (TW)

(73) Assignee: Wistron Corporation, New Taipei (TW)

( * ) Notice: Subject to any disclaimer, the term of this patent is extended or adjusted under 35 U.S.C. 154(b) by 398 days.

(21) Appl. No.: 14/614,370

(22) Filed: Feb. 4, 2015

(65) Prior Publication Data

US 2015/0296037 A1 Oct. 15, 2015

(30) Foreign Application Priority Data

Apr. 14, 2014 (CN) .......................... 2014 1 0148922

(51) Int. Cl.
*H04L 29/08* (2006.01)
*H04L 12/58* (2006.01)

(52) U.S. Cl.
CPC .............. *H04L 67/26* (2013.01); *H04L 51/04* (2013.01); *H04L 51/12* (2013.01)

(58) Field of Classification Search
None
See application file for complete search history.

(56) References Cited

U.S. PATENT DOCUMENTS

| 7,299,409 B2 | 11/2007 | Joshi et al. | |
| 2003/0033533 A1* | 2/2003 | Meisel | H04L 63/126 713/185 |
| 2006/0031234 A1* | 2/2006 | Beartusk | G06Q 10/10 |
| 2006/0117318 A1* | 6/2006 | Rumelhart | G06F 9/5038 718/104 |
| 2009/0210501 A1* | 8/2009 | Risher | H04L 12/585 709/206 |

(Continued)

FOREIGN PATENT DOCUMENTS

| CN | 101330473 | 12/2008 |
| CN | 103347006 | 10/2013 |

(Continued)

OTHER PUBLICATIONS

Office Action of Taiwanese Counterpart Application No. 103114859 dated May 28, 2015 with English translation.

(Continued)

*Primary Examiner* — Kevin T Bates
*Assistant Examiner* — Lesa M Kennedy
(74) *Attorney, Agent, or Firm* — Winston Hsu

(57) ABSTRACT

A Pushlet IM method for pushing a message from a first client device to a second client device includes the steps of: providing a Java-based web service; receiving a message from the first client device, the message including information of a recipient entity; verifying identity of a sender entity who intends to send the message to the recipient entity using the first client device; and creating a thread according to the information of the recipient entity for pushing the message to the second client device that is associated with the recipient entity.

12 Claims, 2 Drawing Sheets

(56) References Cited

U.S. PATENT DOCUMENTS

2014/0229558 A1\* 8/2014 Ricci ................. H04L 51/38
709/206

FOREIGN PATENT DOCUMENTS

| CN | 103365718 | 10/2013 |
|---|---|---|
| EP | 2 397 950 A1 | 12/2011 |

OTHER PUBLICATIONS

Jin, Xiao-dan et al.,"Application of WebIM in Electronic Commerce Systems of Agricultural Products", Computer Knowledge and Technology, vol. 9, No. 7, pp. 1720-1722, Mar. 2013.
Jing, shen yan, "Research and Implementation of Document Monitoring System Based on Pushlet", China Master's Theses Full-text Database, 2011 Issue S1, p. I139-126, Dec. 2011/12.

\* cited by examiner

PUSHLET INSTANT MESSAGING FRAMEWORK AND PUSHLET INSTANT MESSAGING METHOD

CROSS-REFERENCE TO RELATED APPLICATION

This application claims priority of Chinese Application Number 201410148922.7, filed on Apr. 14, 2014, the entire disclosure of which is incorporated herein by reference.

FIELD OF THE INVENTION

The present invention relates to a Pushlet instant messaging method and a Pushlet instant messaging framework.

BACKGROUND OF THE INVENTION

It is found, from an experiment on a conventional Pushlet instant messaging (IM) server, that the speed at which client devices may receive messages becomes slower when a pushing period of the messages ranges between 300 ms to 1 s in the conventional Pushlet IM server. As a result, pending messages in an event queue that are to be pushed to the client devices may pile up since the conventional Pushlet IM server is configured to use a stack method for pushing messages one at a time, increasing load of the conventional Pushlet IM server and resulting in failure to instantly push messages to the client devices.

Moreover, the conventional Pushlet IM server communicates with the client devices based on hypertext transfer protocol (HTTP). Accordingly, the conventional Pushlet IM server cannot communicate with the client devices under other types of communication protocols, such as simple object access protocol (SOAP) and extensible markup language (XML). In other words, applicable fields of the conventional Pushlet IM server are limited.

SUMMARY OF THE INVENTION

Therefore, an object of the present invention is to provide a Pushlet instant messaging (IM) method capable of increasing throughput for transceiving messages, pushing the messages immediately, and communicating with any one of client devices based on various types of communication protocols.

Accordingly, a Pushlet IM method of the present invention is for pushing a message from a first client device to a second client device.

The Pushlet IM method is implemented by a Pushlet IM framework that includes a Pushlet IM interface and a Pushlet IM server. The Pushlet IM server includes a thread pool pattern.

The Pushlet IM method includes the following steps of:

(A) providing, by the Pushlet IM interface, a Java-based web service, each of the first client device and the second client device being capable of connecting to the Pushlet IM interface by executing a browser to access the Java-based web service under a communication protocol of the Java-based web service;

(B) receiving, by the Pushlet IM interface, at least one message that is sent from the first client device and that includes information of a recipient;

(C) verifying, by the Pushlet IM interface, identity of a sender entity who intends to send the message to the recipient using the first client device;

(D) sending, by the Pushlet IM interface, the message to the Pushlet IM server when the identity of the sender entity is verified in step (C); and (E) creating, by the thread pool pattern, at least one thread according to the information of the recipient in the message for pushing the message to the second client device, which is associated with the recipient entity.

Another object of the present invention is to provide a Pushlet instant messaging (IM) framework capable of increasing throughput for transceiving messages, pushing the messages immediately, and communicating with any one of client devices based on various types of communication protocols.

According to another aspect, a Pushlet IM framework of the present invention is adapted to be operative over a communication network and is configured to push at least one message from a first client device to at least one second client device. The Pushlet IM framework includes a Pushlet IM interface and a Pushlet IM server.

The Pushlet IM interface is configured to provide a Java-based web service, and includes a sender entity-verifying module. The Pushlet IM server includes at least one thread pool pattern. The Pushlet IM interface connects to each of the first client device and the second client device, and receives the message that is sent from the first client device and that includes information of a recipient. The sender entity-verifying module of the Pushlet IM interface verifies identity of a sender entity who intends to send the message to the recipient using the first client device, and send the message to the Pushlet IM server when the identity of the sender entity is verified. The thread pool pattern creates at least one thread according to the information of the recipient in the message for pushing the message to the second client device that is associated with the recipient entity.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
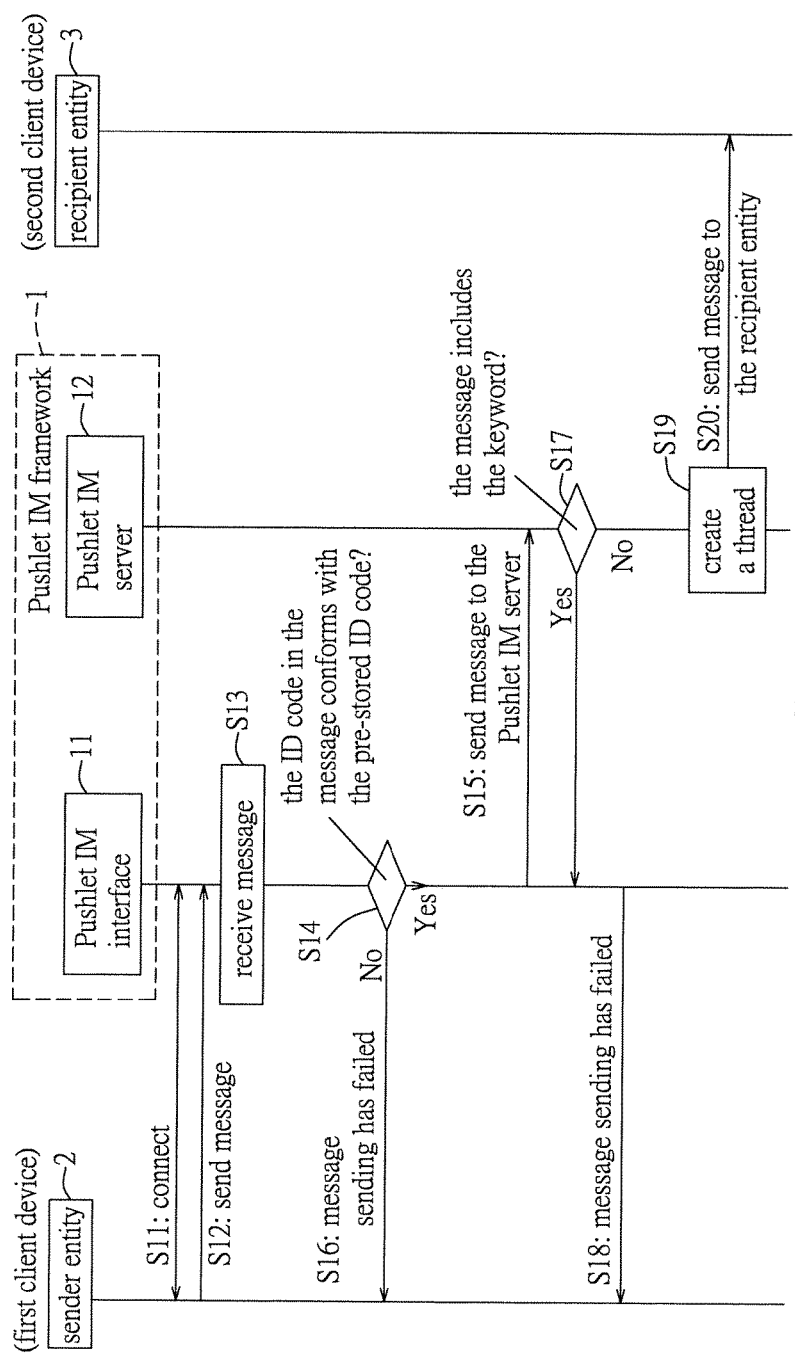
FIG. 1 is a flowchart of a Pushlet instant messaging (IM) method according to an embodiment of the present invention.
Figure 2:
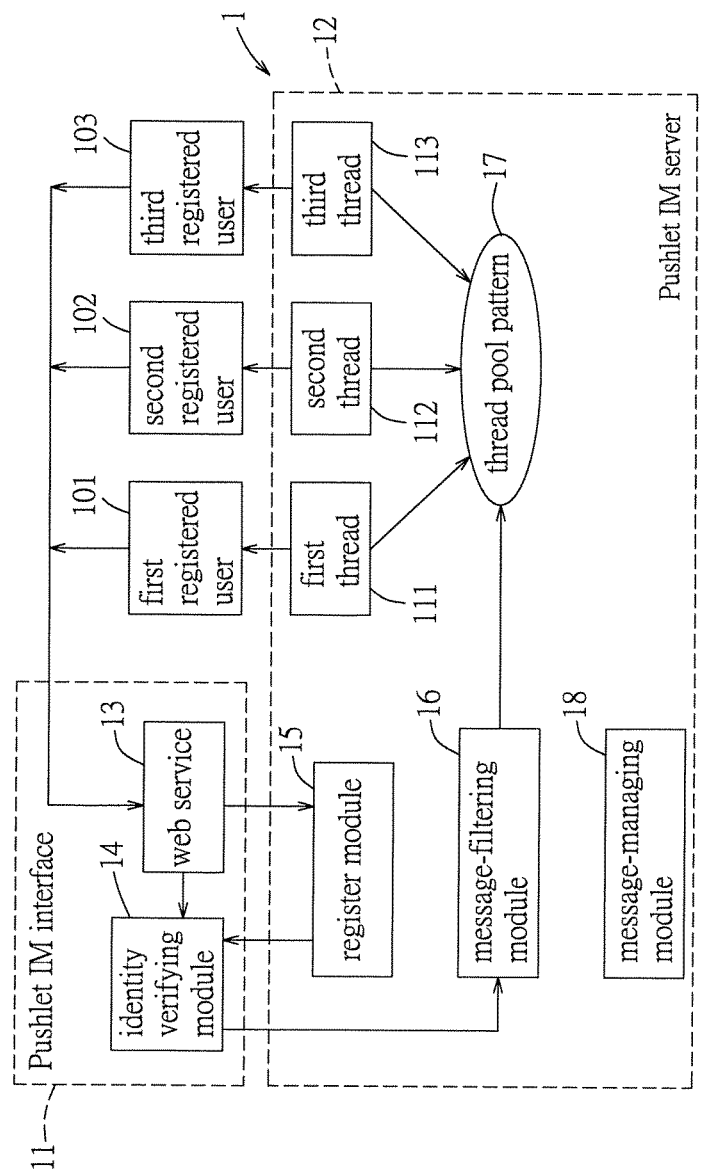
FIG. 2 is a schematic block diagram of a Pushlet instant messaging (IM) framework according to the embodiment of the present invention.

Referring to FIG. 1, a flow chart of a Pushlet instant messaging (IM) method for pushing a message from a first client device 2 to at least one second client device 3 according to an embodiment of the present invention is shown. Referring further to FIG. 2, the Pushlet IM method is implemented by a Pushlet IM framework 1. The Pushlet IM framework 1 includes a Pushlet IM interface 11 and a Pushlet IM server 12. The Pushlet IM interface 11 is configured to provide a Java-based web service 13, and includes an identity verifying module 14. The Pushlet IM server 12 includes a register module 15, a message-filtering module 16 and a thread pool pattern 17.

Since the web service 13 provided by the Pushlet IM interface 11 is based on Java programming language that is unconstrained for various platforms, the first and second client devices 2, 3 may not be restrained by a certain type of communication protocol, such as hypertext transfer protocol (HTTP), for accessing the Java-based web service 13 by executing a browser. In other words, as long as the first client device 2 and the second client device 3 comply with a communication protocol of the Java-based web service 13, the first and second client devices 2, 3 are capable of connecting to the Pushlet IM interface 11 to transceive the messages via the Pushlet IM server 12 under a data format complying with any type of communication protocol, such as HTTP, simple object access protocol (SOAP) and extensible markup language (XML).

Before sending and receiving the messages via the Pushlet IM framework 1, a sender entity and a recipient entity should be registered to the register module 15 of the Pushlet IM server 12 by providing register information (e.g., personal data) associated respectively with a sender and a recipient. After the sender entity and the recipient entity are successfully registered, the register module 15 issues identification (ID) codes that are dedicated to the sender and recipient entities, respectively. Meanwhile, the register module 15 stores the register information and the ID codes in a client database thereof such that the sender entity and the recipient entity are classified as registered users. Moreover, the register module 15 allows the identity verifying module 14 of the Pushlet IM interface 11 to access the client database for ID verification of the sender entity and the recipient entity. It is noted that the sender entity and the recipient entity in this embodiment refer respectively to the sender and the recipient who intend to use respectively the first client device 2 and the second client device 3 to access the Java-base web service 13 for transceiving at least one message, but may refer to the first client device 2 and the second client device 3 in other embodiments. In the case where the sender entity and the recipient entity refer to the first client device 2 and the second client device 3, the register information may include hardware information of the first and second client devices 2, 3, and the ID codes are dedicated to the first and second client devices 2, 3, respectively.

In step S11 of the Pushlet IM method, the first client device 2 connects to the Pushlet IM interface 11 by executing a browser to access the Java-based web service 13 under the communication protocol of the Java-based web service 13. Then, in step S12, the Java-based web service 13 provided by the Pushlet IM interface 11 receives the message that is sent from the first client device 2 and that is based on any one of the well-defined data formats. The message includes a main content, the ID code of the sender entity and information of the recipient entity. For example, the information of the recipient entity is the ID code dedicated to the recipient entity.

After receiving the message from the first client device 2, the Java-based web service 13 sends the message to the identity verifying module 14 in step S13. In step S14, the identity verifying module 14 verifies identity of the sender entity who intends to send the message to the recipient entity using the first client device 2. For instance, the identity verifying module 14 determines whether the ID code included in the message conforms with the ID code stored in the client database of the register module 15, and verifies the identity of the sender entity is the registered user when the determination is affirmative. If the identity of the sender entity is verified as the registered user, the message will be sent to the Pushlet IM server 12 in step S15. Otherwise, in step S16, sending of the message is deemed to have failed and the first client device 2 will be notified accordingly.

After the Pushlet IM server 12 receives the message, the message-filtering module 16 of the Pushlet IM server 12 filters the message in step S17. For example, the message-filtering module 16 pre-stores at least one keyword, determines whether the message includes the keyword, and forwards the message to the thread pool pattern 17 when it is determined that the message does not include the keyword. It is understood that the keyword may vary based upon different requests such that transmission of unwanted messages may be prevented. When it is determined that the message includes the keyword, sending of the message is deemed to have failed and the first client device 2 will be notified accordingly in step S18.

In step S19, the thread pool pattern 17, according to the information of the recipient entity in the message, creates at least one thread that is dedicated to the recipient entity (e.g., the recipient or the second client device 3). Then, in step S20, the thread pool pattern 17 sends the message to a browser of the second client device 3 that is associated with the recipient entity through the thread.

For example, see FIG. 2, if the message includes information of a first registered user 101, a second registered user 102 and a third registered user 103 that all serve as the recipient entities, respectively, the thread pool pattern 17 creates a first thread 111, a second thread 112 and a third thread 113 that are dedicated to the first registered user 101, the second registered user 102 and the third registered user 103, respectively. Therefore, the thread pool pattern 17 pushes simultaneously the message to each of the first, second and third registered users 101, 102, 103 (i.e., the recipient entities) through the first, second and third threads 111, 112, 113, respectively. As a result, the messages may be pushed instantly to the registered users 101, 102, 103 without accumulation.

In a case that the Pushlet IM server 12 receives in sequence a plurality of messages including information of a plurality of recipient entities that are associated respectively with a plurality of second client devices, the thread pool pattern 17 may create, in step S19, a plurality of threads for pushing simultaneously the messages to the second client devices, respectively. The threads are dedicated to the second client devices, respectively.

Moreover, the Pushlet IM server 12 further includes a message-managing module 18 for managing sent messages. The message-managing module 18 may provide additional functions using the sent messages, such as generating information report and user-log record, providing the keyword for filtering the message to the message-filtering module 16, etc.

To conclude, by virtue of the Java-based web service 13 of the Pushlet IM interface 11, the first and second client devices 2, 3 are capable of connecting to the Pushlet IM interface 11 and are operable to push the messages via the Pushlet IM server 12 with any data format of various types of communication protocols. Moreover, the thread pool pattern 17 of the Pushlet IM server 12 creates, according to the information of the recipient entities in the message, the threads that are dedicated respectively to the registered users such that messages may be sent instantly and simultaneously to the recipient entities.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A Pushlet instant messaging (IM) method for pushing at least one message from a first client device to at least one second client device, said Pushlet IM method to be implemented by a Pushlet IM framework including a Pushlet IM interface and a Pushlet IM server, the Pushlet IM server including a thread pool pattern, said Pushlet IM method comprising the steps of:

(A) providing, by the Pushlet IM interface, a Java-based web service, each of the first client device and the second client device being capable of connecting to the Pushlet IM interface by executing a browser to access the Java-based web service under a communication protocol of the Java-based web service;

(B) receiving, by the Pushlet IM interface, the message that is sent from the first client device via the Java-based web service and that includes information of a recipient entity;

(C) using, by the Pushlet IM interface, the Java-based web service to verify identity of a sender entity who intends to send the message to the recipient entity using the first client device;

(D) sending, by the Pushlet IM interface, the message to the Pushlet IM server when the identity of the sender entity is verified in step (C); and (E) creating, by the thread pool pattern, at least one thread according to the information of the recipient entity in the message for pushing the message to the second client device, which is associated with the recipient entity.

2. The Pushlet IM method as claimed in claim 1, the Pushlet IM server further including a message-filtering module that pre-stores at least one keyword, wherein said Pushlet IM method further comprises, between steps (D) and (E), the steps of:

determining, by the message-filtering module, whether the message includes the keyword; and forwarding, by the message-filtering module, the message to the thread pool pattern when it is determined that the message does not include the keyword.

3. The Pushlet IM method as claimed in claim 1, the Pushlet IM server further including a register module that has a client database storing at least one identification code dedicated to a registered user entity, wherein:

the message received in step (B) further includes an identification code associated with the sender entity; and in step (C), the Pushlet IM interface determines whether the identification code included in the message conforms with the identification code stored in the client database, and verifies the identity of the sender entity as the registered user entity when the determination is affirmative.

4. The Pushlet IM method as claimed in claim 1, the Pushlet IM server further including a register module that has a client database storing at least one identification code dedicated to a registered user entity, wherein the information of the recipient entity is the identification code.

5. The Pushlet IM method as claimed in claim 1, the message including information of a plurality of the recipient entities that are associated with a plurality of the second client devices, respectively, wherein, in step (E), the thread pool pattern creates a plurality of threads for pushing simultaneously the message to each of the second client devices, the threads being dedicated to the second client devices, respectively.

6. The Pushlet IM method as claimed in claim 1, wherein, when the Pushlet IM server receives in sequence, in step (D), a plurality of the messages including information of a plurality of the recipient entities that are associated respectively with a plurality of the second client devices, the thread pool pattern creates, in step (E), a plurality of threads for pushing simultaneously the messages to the second client devices, respectively, the threads being dedicated to the second client devices, respectively.

7. A computer system adapted to be operative over a communication network, configured to push at least one message from a first client device to a second client device, and comprising:

a processing unit; and a memory, for storing a program code, wherein the program code instructs the processing unit to execute the following steps:

connecting to each of the first client device and the second client device, and receiving at least one message that is sent from the first client device via a Java-based web service and that includes information of a recipient entity;

using the Java-based web service to verify identity of a sender entity who intends to send the message to the recipient entity using the first client device; and when the identity of the sender entity is verified, creating at least one thread according to the information of the recipient entity in the message for pushing the message to the second client device that is associated with the recipient entity.

8. The computer system as claimed in claim 7, wherein the memory further pre-stores at least one keyword, the program code further instructs the processing unit to determine whether the message includes the keyword, and forward the message when it is determined that the message does not include the keyword.

9. The computer system as claimed in claim 7, wherein the memory further includes a client database storing at least one identification code dedicated to a registered user entity;

the message further includes an identification code associated with the sender entity; and the program code further instructs the processing unit to determine whether the identification code included in the message conforms with the identification code stored in the client database, and verifies the identity of the sender entity as the registered user entity when the determination is affirmative.

10. The computer system as claimed in claim 7, wherein the memory further includes a client database storing at least one identification code dedicated to a registered user entity, and wherein the information of the recipient entity is the identification code.

11. The computer system as claimed in claim 7, wherein the message includes information of a plurality of recipient entities that are associated with a plurality of the second client devices, respectively, and wherein the program code further instructs the processing unit to create a plurality of threads for pushing simultaneously the message to each of the second client devices, the threads being dedicated to the second client devices, respectively.

12. The computer system as claimed in claim 7, wherein, when the processing unit receives in sequence a plurality of the messages including information of a plurality of the recipient entities that are associated respectively with a plurality of the second client devices, the program code further instructs the processing unit to create a plurality of threads for pushing simultaneously the messages to the second client devices, respectively, the threads being dedicated to the second client devices, respectively.

* * * * *